3,454,411
COLOR STABILIZED DEXTRIN ADHESIVES
Wadym Jarowenko, Plainfield, and Joseph P. McGovern, North Plainfield, N.J., assignors to National Starch and Chemical Corporation, New York, N.Y., a corporation of Delaware
No Drawing. Filed Oct. 14, 1966, Ser. No. 586,644
Int. Cl. C09j *3/06, 3/00;* C08k *1/32*
U.S. Cl. 106—208   9 Claims

ABSTRACT OF THE DISCLOSURE

A method for the preparation and stabilization of dextrin based adhesive compositions which are characterized by a minimum degree of undesirable discoloration; said method comprising the initial step of admixing formaldehyde with an aqueous suspension of a dextrin at a point in time prior to both the cooking of said mixture and to the addition of the other essential components of said adhesive. The color stabilized dextrin based adhesives resulting from the latter procedure.

---

This invention relates to a method for the preparation and stabilization of dextrin-based adhesives characterized by a minimum degree of undesirable discoloration, as well as to the color stabilized dextrin adhesives resulting therefrom.

Dextrin-based adhesives, and particularly borated dextrin adhesives, are among the most frequently used starch-based adhesive systems. Thus, dextrin-based adhesives are often utilized in such areas as the manufacture of multi-wall bags, envelopes and gummed tapes as well as for the lamination of varied cellulosic substrates and the sealing of cases and cartons. The presence of borax, i.e. hydrated sodium borate, in dextrin-based adhesives is viewed as a major refinement in their preparation and use. Thus, the most important effect resulting from the addition of borax is the increase in the viscosity of these systems, thereby enabling the practitioner to obtain equivalent viscosity and tack characteristics at lower solids contents as compared with similar dextrin-based systems which are devoid of borax. Furthermore, borated adhesive systems exhibit remarkable increases in cohesiveness, tack, speed of tack, body and stability.

Borax is often utilized in combination with such alkaline reagents as sodium hydroxide, and sodium carbonate as well as with mixtures of the latter reagents with sodium silicate solutions. The resulting alkaline adhesive systems provide still further improved performance as evidenced by their quicker bonding speeds and their increased penetration and anchorage into cellulosic substrates. This latter property is of special importance when working with difficult to adhere paper stock.

Unfortunately, however, the addition of the latter alkaline reagents tends to produce a severe darkening in the color of the resulting adhesive solutions which thereafter yield dark, unsightly, adhesive films. These dark films are especially disadvantageous when they are applied to exposed surfaces, such as labels and envelopes, etc., as well as to light colored paper stock. Thus, for example, in the manufacture of paper food containers, the unavoidable "squeeze out" of excessive adhesive past the area of bonding clearly exposes these unattractive, dark colored adhesive films. Furthermore, deep penetration of the liquid adhesive creates dark, unsightly, bonding seams.

In attempting to remedy the latter difficulties, practitioners in the art have resorted to the use of conventional bleaching agents, such as peroxides, bisulfites and perborates, in order to restore the desirable light color of these dextrin-based adhesives. This procedure has not met with success, however. Thus, the addition of conventional bleaching agents to the adhesive solution prior to the introduction of the alkaline reagents has had no deterrent effect on the subsequent occurrence of the discoloration. Furthermore, their introduction after the alkaline reagent has been added to the system has caused a general deterioration of the adhesive performance of such products as evidenced by their reduced bonding speed and tackiness as well as by their lack of a stable viscosity.

It is, thus, the prime object of this invention to modify borated dextrin adhesive systems in such a manner that they will retain their original light color despite the subsequent addition, thereto, of alkaline reagents. It is a further object to provide the latter color stabilization without adversely affecting the adhesive properties of the resulting borated dextrin adhesives. Various other objects and advantages of this invention will become apparent to the practitioner from the following detailed description thereof.

We have now, surprisingly, found that as a result of the introduction of a limited concentration range of formaldehyde to borated dextrin adhesives prior to the addition, thereto, of alkaline reagents, the initial light color of the thus treated adhesive systems will be maintained for prolonged periods without any deleterious effects upon their adhesive properties.

As is well known in the art, dextrins are the conversion products formed by the incomplete degradation of starch as a result of the action of dilute acids or by heating of the dry starch or by the enzyme modification thereof. It should be noted that when reference is made to "dextrins" in the process of this invention, the latter term is exclusively limited to the so-called "white dextrins" which are prepared by the hydrolysis of starch using from about 0.05 to 0.3% of mineral acid, on the weight of the starch, at a temperature range of from about 80 to 150° C. Thus, canary dextrins and British gums are excluded from the scope of this invention because they impart an objectionable natural dark color to adhesive systems which does not result from the presence of any extraneous alkali and which is not, therefore, eliminated by treatment with formaldehyde according to the process of this invention.

The white dextrins applicable for use in our novel adhesives may be prepared from all starch bases, e.g. tapioca, potato, corn and waxy maize. These applicable starch bases may be in their raw, unmodified state or they may have been previously modified in any desired manner as, for example, by hydrolysis, oxidation, esterification or etherification. As contrasted with the manufacture of canary dextrins and British gums, the temperature range employed for the conversion of white dextrins is relatively low while the proportion of dilute mineral acids which is admixed with the starch is relatively high. The resulting white dextrins generally have a lower percentage of cold water soluble constituents, are lighter in color and display increased pasting tendencies. Additional information relating to the dextrinization of starches may be obtained by reference to chapters XII–XIII of "Chemistry and Industry of Starch," by R. W. Kerr, published in 1950 by the Academic Press of New York, N.Y.

Conventional borated dextrin adhesives are prepared by the cooking, at temperatures of about 80–100° C. and for a period of about 30–60 minutes, of a mixture consisting of the selected dextrin, borax and water, followed by the addition of the desired alkaline reagents. Typical alkaline reagents include: alkali metal hydroxides such as sodium hydroxide, alkali metal silicates such as sodium silicate and sodium meta-silicate, alkali metal carbonates such as sodium carbonate, alkaline-earth hydroxides such as calcium hydroxide and alkaline-earth oxides such as barium oxide. The concentration of borax in these formulations is usually about 10–15%, by weight, while the concentration of alkaline reagent is about 2–35%, by weight; the latter concentrations being based on the weight of dextrin solids in the adhesive composition. The resulting adhesive solutions, which should be at a pH level exceeding about 9.0, will be found to immediately or upon short periods of aging, exhibit an undesirable dark coloration which will, moreover, be particularly severe when sufficient alkali has been added so as to raise the pH level of the system to a level in excess of about 10.0.

In order to achieve the color stabilization resulting from the process of this invention, formaldehyde is thereupon added to the initial dextrin-water mix at a point in their preparation which is prior to the cooking thereof as well as to the addition of the borax and alkali thereto. Since formaldehyde does not ordinarily function as a bleaching agent, it has no measurable effect when it is introduced after the addition of the alkaline reagent and the consequent development of discoloration. It should be noted that the above described procedure for the preparation of borated dextrin adhesives does not require any additional alterations as a result of the process of this invention.

With regard to proportions, the concentration of formaldehyde should range from about 0.9 to 3.0%, as based on the weight of dextrin solids in the adhesive composition. Concentrations of formaldehyde which are less than about 0.9%, by weight, do not provide adequate color stabilization while concentrations exceeding about 3.0%, by weight, although yielding increased color stability, have adverse effects upon the performance of these systems as adhesives as is evidenced by a viscosity build-up, a sluggish flow, a decrease of tackiness and a decrease in setting speed. Thus, it is observed that the above specified concentration range simultaneously provides maximum color stability with a minimum degree of deleterious effects upon the various other properties of the resulting products.

Although the exclusive addition of formaldehyde imparts excellent color stabilization to borated dextrin adhesives, we have further found that the optimal use of sodium bisulfite in conjunction with formaldehyde provides still further improvements upon the performance which is achieved with the formaldehyde. This combination of reagents is most effective when the formalehyde is present in a concentration ranging from about 0.9 to 3.0% and the sodium bisulfite is present in a concentration ranging from about 0.3 to 0.8%; the latter concentration ranges being based on the weight of dextrin solids in the adhesive composition. Inasmuch as sodium bisulfite does not by itself produce color stability in solutions of borated dextrins, it must be admixed with the latter adhesive system at the same time as the addition of the formaldehyde, i.e. it must be introduced prior to the alkali addition step.

The presence of formaldehyde in the borated dextrin adhesives resulting from the process of this invention limits neither the techniques which may be used to apply these adhesives nor the substrates to which they may be applied. Thus, they may be deposited on a wide variety of both cellulosic and non-cellulosic substrates; their application being accomplished by the use of any technique which is capable of depositing a continuous adhesive film on the surface of the respective substrate.

In the following examples, which further illustrate the embodiment of this invention, all parts given are by weight unless otherwise specified.

EXAMPLE I

This example illustrates the preparation, by means of the process of this invention, of a typical color stabilized, borated dextrin adhesive.

A vessel fitted with means for mechanical agitation was charged with the following reagents:

| | Parts |
|---|---|
| White dextrin | 90.0 |
| Water | 110.0 |
| An aqueous solution containing 37%, by weight, of formaldehyde | 5.2 |

The resulting mixture was then cooked at a temperature of 93–95° C. for a period of 30 minutes. Thereupon, the mixture was cooled to 60° C. and 9.6 parts of borax were added under agitation. The resulting mix was further cooled to 38° C., whereupon a mixture of 21.3 parts of a 25%, by weight, aqueous sodium hydroxide solution and 63.0 parts of a 42° Bé. aqueous sodium silicate solution was added under agitation. The pH level of the resulting adhesive solution was 11.5.

It was thereafter observed that despite the addition of the indicated alkaline reagents, the original light tan color of the adhesive blend was maintained. This result is to be contrasted with the conventional borated dextrin adhesive control which was prepared in the manner described hereinabove, with the exception that formaldehyde was entirely omitted therefrom. Thus, upon the addition of the alkaline reagents, the latter control immediately exhibited a dark brown color.

In order to quantitatively determine the color differences between the stabilized and non-stabilized adhesive solutions, a Hellige Comparator-Daylite Illuminator, as manufactured by Hellige, Inc., of Long Island City, N.Y., was utilized. The latter device employs a series of color discs which range from off-white to dark brown in their respective colors and which have arbitrary numerical values ranging from 1, for an off-white color, to 18 for a dark brown color, assigned thereto. The adhesive samples being tested are, thus, visually compared with the various color discs and are then assigned the numerical value, i.e. the Hellige value, of the disc which most closely approximates its own color. Thus, the lighter the color of the adhesive solution, the lower its assigned Hellige value.

Upon being subjected to the latter color comparison procedure, the color stabilized, borated dextrin adhesive whose preparation was described in Example I exhibited a Hellige value of 8, while the above mentioned control (the conventional borated dextrine adhesive) exhibited a Hellige value of 14. Furthermore, the borated dextrin adhesive which contained neither formaldehyde nor additional alkali exhibited a Hellige value of 8; the latter results thus clearly indicating the discoloration which results from the presence of excess alkali and the effective resistance to such discoloration which is provided by the presence of formaldehyde in the adhesive blend as a result of the novel process of this invention.

The above described preparative procedure was then repeated under identical conditions with the exception, in this instance, that the aqueous formaldehyde solution was added subsequent to the cooking and alkali addition steps. The resulting borated dextrin adhesive system exhibited a Hellige value of 14, thus indicating the necessity for adding the formaldehyde prior to the cooking and alkaline addition steps in order to achieve optimum color stabilization.

EXAMPLE II

This example illustrates the use of a number of different concentrations of formaldehyde in stabilizing the color of borated dextrin adhesive blends. It further illustrates the effective color stabilization resulting from the use of formaldehyde-sodium bisulfite blend in the process of this invention.

The recipe and procedures set forth in Example I were utilized to prepare the formulations set forth in this example. However, in this instance, the concentration of formaldehyde was varied, as specified in the following table, while 0.3 parts of sodium bisulfite were added to the borax-dextrin mix at the same time as the addition of the formaldehyde thereto. In all instances the pH level of the resulting adhesive solutions was approximately 11.5.

The resulting adhesive blends were submitted to the color comparison test described in Example I, the results of these determinations also appearing in the following table.

| Formulation No. | Parts of 37%, by weight, aqueous formaldehyde solution | Hellige value |
|---|---|---|
| 1 | 0 | 14 (unacceptable). |
| 2 | 2.4 | 12 (acceptable). |
| 3 | 4.8 | 9 (excellent). |
| 4 | 7.2 | 8 (excellent). |
| 5 | 12.0 | 8 (excellent). |
| 6 | 20.0 | 8 (excellent). |

Despite the fact that Formulations 5 and 6 exhibited excellent color stability, they could not be readily utilized for adhesive applications because of their poor adhesive performance. Thus, Formulation 5 exhibited an increased viscosity as well as a reduced tackiness and setting speed, while Formulation 6 exhibited a totally unmanageable gel-like consistency; the latter characteristics being indicative of the adhesive deterioration exhibited by adhesive compositions containing formaldehyde concentrations which exceed the limit specified for use in the process of this invention.

It is also to be noted that upon aging each of the above described adhesive solutions at a temperature of 72–80° F., an extended period of about six months for Formulation 2 and of about 11 months for Formulations 3 and 4 were required, respectively, in order for these formulations to achieve the dark brown color, i.e. Hellige value 14, which was attained by the unstabilized adhesive solution, i.e. Formulation 1, immediately subsequent to its preparation.

The data summarized above thus clearly indicates the excellent color stability imparted to borated dextrin adhesives by the use of the novel process of this invention.

Summarizing, it is thus seen that this invention provides for the preparation of borated dextrin adhesive systems which are notably resistant to the color degradation resulting from the subsequent addition of alkaline reagents thereto.

Variations may be made in proportions, procedures and materials without departing from the scope of this invention which is defined by the following claims.

We claim:
1. A process for the preparation and simultaneous color stabilization of borated dextrin adhesive compositions, said process comprising the initial step of admixing from about 0.9 to 3.0% of formaldehyde, as based on the weight of dextrin solids in said adhesive composition, with an aqueous suspension containing a minor proportion, by weight, with respect to the water therein of a white dextrin; the admixture of said formaldehyde with said dextrin solids occurring prior to the steps of: (1) cooking said suspension at elevated temperatures of from about 80–100° C.; the latter cooking step occurring prior to each of steps (2) and (3) which comprise, respectively, (2) admixing borax to the thus cooked suspension; and (3) adding at least one alkaline reagent thereto.

2. The process of claim 1, wherein said alkaline reagent is selected from the group consisting of alkali metal hydroxides, alkali metal silicates, alkali metal carbonates, alkaline-earth hydroxides and alkaline-earth oxides.

3. The process of claim 1, wherein the pH of the resulting adhesive compositions is at a level of at least about 9.0.

4. The process of claim 1, wherein from about 0.3 to 0.8% of sodium bisulfite, as based on the weight of dextrin solids in said adhesive composition, is admixed with said adhesive composition at the same time as the admixture of formaldehyde therewith.

5. An adhesive composition characterized by its color stability, said adhesive composition having a pH level of at least about 9.0 and comprising an aqueous mixture of a white dextrin, formaldehyde and sodium bisulfite, admixed with borax and at least one alkaline reagent; said formaldehyde being present in a concentration of from about 0.9 to 3.0% and said sodium bisulfite being present in a concentration of from about 0.3 to 0.8%, the latter concentrations being based on the weight of dextrin solids in said adhesive composition.

6. The adhesive composition of claim 5, wherein said alkaline reagent is selected from the group consisting of alkali metal hydroxides, alkali metal silicates, alkali metal carbonates, alkaline-earth hydroxides and alkaline-earth oxides.

7. A substrate coated with an adhesive film comprising the dried, consolidated residue of a color stabilized adhesive composition comprising an aqueous mixture of a white dextrin, formaldehyde and sodium bisulfite, admixed with borax and at least one alkaline reagent; said formaldehyde being present in a concentration of from about 0.9 to 3.0% and said sodium bisulfite being present in a concentration of from about 0.3 to 0.8%, the latter concentrations being based on the weight of dextrin solids in said adhesive composition.

8. The substrate of claim 7, wherein said alkaline reagent in said adhesive composition is selected from the group consisting of alkali metal hydroxides, alkali metal silicates, alkali metal carbonates, alkaline-earth hydroxides and alkaline-earth oxides.

9. The substrate of claim 7, wherein said adhesive composition is at a pH level of at least about 9.0.

References Cited

UNITED STATES PATENTS

| 3,224,903 | 12/1965 | Commerford | 127—32 |
| 1,786,417 | 12/1930 | Alexander | 106—213 |
| 3,184,333 | 5/1965 | Swanson et al. | 117—156 |
| 3,379,547 | 4/1968 | Huebschmann et al. | 106—210 |
| 2,396,937 | 3/1946 | Bauer et al. | 260—209 |

JULIUS FROME, *Primary Examiner.*

T. MORRIS, *Assistant Examiner.*

U.S. Cl. X.R.

106—210, 213; 117—156; 127—32